May 16, 1933.  J. B. HOLTSON  1,908,844
SWIVEL ELBOW JOINT
Filed Sept. 25, 1930
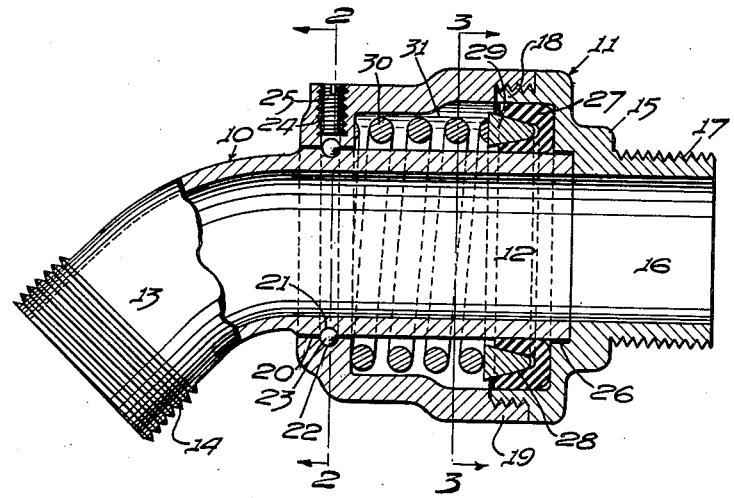
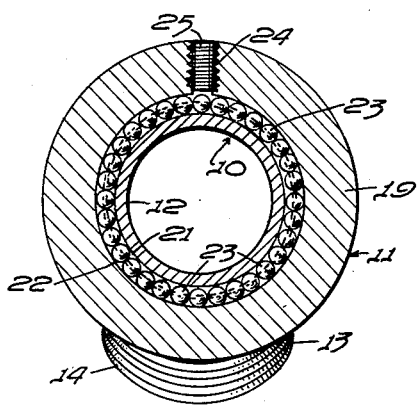
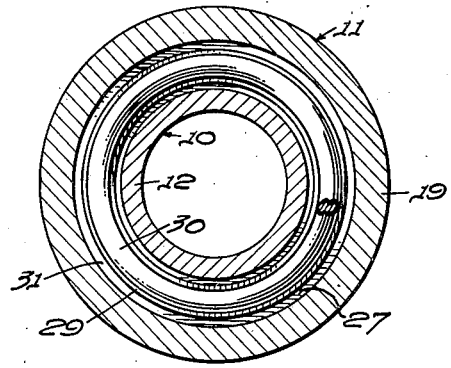
Inventor
James B. Holtson
Attorney Patented May 16, 1933

1,908,844

UNITED STATES PATENT OFFICE

JAMES B. HOLTSON, OF TOWSON, MARYLAND

SWIVEL ELBOW JOINT

Application filed September 25, 1930. Serial No. 484,403.

The invention relates to swivel connections, particularly for conduits or pipes, and has for its general object the provision of a novel sectional elbow or joint in which the parts are relatively rotatable.

An important object of the invention is to provide a swivel elbow pipe connection particularly well adapted for use in connection with a hose for dispensing gasoline or other liquids, the structure moreover embodying novel packing means which is interiorly located and which will operate automatically to take up any looseness caused by wear and insure a leak-proof joint at all times.

Another object of the invention is to provide a swivel joint of this character embodying spring pressed wedge means cooperating with packing means, the latter acting to exclude any gasoline or other liquid being handled from the spring and wedge means so that these elements may, if desired, be packed in lubricant so as to insure easy relative movement of the parts.

A further object of the invention is to provide a joint of this character incorporating bearing balls which not only reduce the friction between the parts but which also act as means for locking the parts against separation.

An additional object is to provide a device of this character which will be simple and inexpensive to manufacture and assemble, very easy to use, positive in action, efficient and durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawing in which:

Figure 1 is a longitudinal section through the device with the end portion of one member shown in elevation, Figure 2 is a cross section taken on the line 2—2 of Figure 1, and Figure 3 is a cross section taken on the line 3—3 of Figure 1.

Referring more particularly to the drawing I have shown my coupling as comprising a pair of relatively rotatable sections 10 and 11 having associated therewith locking and packing means to be described in detail. The section 10 is shown as an angled pipe including a main portion 12 at any desired angle to which extends an outlet portion 13 which may be exteriorly threaded as at 14 for connection of any suitable hose coupling or the like therewith. The section 11 is disclosed as comprising a member 15 having a bore 16 communicating with and preferably constituting an extension of the bore in the elongated main portion 12 of the section 10, the bore 16 being surrounded by an exteriorly threaded flange or nipple 17 adapted for connection with a tank, pump, hose coupling or the like, such details being immaterial and depending entirely upon the use to which the device is to be put and other considerations. The threaded flange portion or nipple 17 is relatively small in diameter as compared with the major portion of the member 15 and this major portion terminates in a reduced exteriorly threaded extension 18 upon which is screwed the interiorly threaded and recessed end of a shell 19 which has its opposite end portion formed with an opening 20 rotatably receiving the main portion 12 of the section 10.

In order to lock the sections 10 and 11 together so that they cannot become separated in use, the main portion 12 is shown as formed with a peripheral groove 21 opposite to a similar groove 22 in the wall of the opening 20, these grooves mating and operating to receive and retain a circular series of bearing balls 23 which are introduced through an opening 24 in the shell 19, which opening is intended and adapted to be subsequently closed by a grub screw 25 or the like so that the balls cannot drop out after they are in position. Clearly these balls fitting within the mating recesses will constitute an interlock.

The inner end of the main portion 12 of the section 10 is received within a countersunk recess 26 in the member 15 but as this is insufficient to make a tight joint, I provide a novel packing means here shown as comprising a washer or gasket 27 which is substantially U-shaped in cross section and which is located within the confines of the reduced extension 18. Fitting within the annular groove 28 in one face of this washer or gasket is a wedge ring 29 which is substantially V-shaped in cross section and which operates to expand the washer both outwardly and inwardly. A coil spring 30, located within the shell 19 in surrounding relation to the main portion 12 of the pipe section 10 abuts at one end against the end of the shell and at its other end against the wedge ring 29, the constant pressure of this spring against the wedge ring causing the latter to force the outer portion of the washer or gasket 27 against the inner wall of the extension 18 and the inner portion of the gasket against the outer periphery of the main portion 12 of the pipe section 10. It is consequently apparent that there will always be a close fit at these surfaces so that whatever liquid is flowing through the device cannot work its way into the space 31 within the shell and as a consequence this space may, if desired, be packed with graphite or other suitable lubricant. Furthermore the exclusion of liquid from this space or chamber will prevent rusting of the spring and the wedge ring even though the liquid handled may be or contain water or contain any other substance likely to corrode or injuriously affect the metal.

The device is of course used in exactly the same manner as any other swivel joint and it is immaterial whether it be used in association with dispensing pumps for hydrocarbons or the like or for any other purpose. Liquid will flow through the device from either end desired and cannot work its way into the spring chamber for the reason above explained. Either section 10 or 11 may be held stationary, depending upon circumstances and where the device is used and whichever is held stationary it is apparent that the other may move freely particularly on account of the provision of the bearing balls which will obviously reduce friction to the minimum in addition to performing their function of locking the parts together. It is believed that the construction, operation and advantages will be readily apparent to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claim hereunto appended.

Having thus described the invention, I claim:

A swivel pipe joint comprising a pair of sections, one formed as an elongated cylindrical member having a bore and a counterbore and provided with a laterally offset exteriorly threaded longitudinally extending flange, the other member being of cylindrical form and having one end rotatably engaged within said counterbore and having a bore registering with the first named bore, a shell interiorly threaded at one end and detachably engaged upon said exteriorly threaded flange and having its other end formed with an inwardly directed flange closely adjacent to the second named member and rotatably receiving the same, means located within said inwardly directed flange and cooperating with the second named member for preventing relative longitudinal movement of both members while enabling the same to have rotary movement, said inwardly directed flange on the shell defining a compartment within the interior thereof, a packing member substantially U-shaped in cross section located within the confines of said first named flange and having its closed portion bearing against the wall of said first named member between the counterbore therein and the first named flange, said packing having diverging walls one of which bears against the inner periphery of said first named flange and the other of which bears against the outer periphery of said second named member, a wedge ring substantially V-shaped in cross section fitting within said U-shaped packing member, and a coil spring surrounding the second named member within said compartment and abutting at one end against said inwardly directed flange and at its other end against said wedge ring for effecting expansion of said packing member to prevent fluid passing through said alined bores from leaking into said compartment.

In testimony whereof I affix my signature.

JAMES B. HOLTSON.